March 12, 1929.  A. CARPENTER  1,704,691
WATER WHEEL
Filed March 30, 1927   2 Sheets-Sheet 1

Inventor
Arthur Carpenter
By C. A. Snow & Co.
Attorneys.

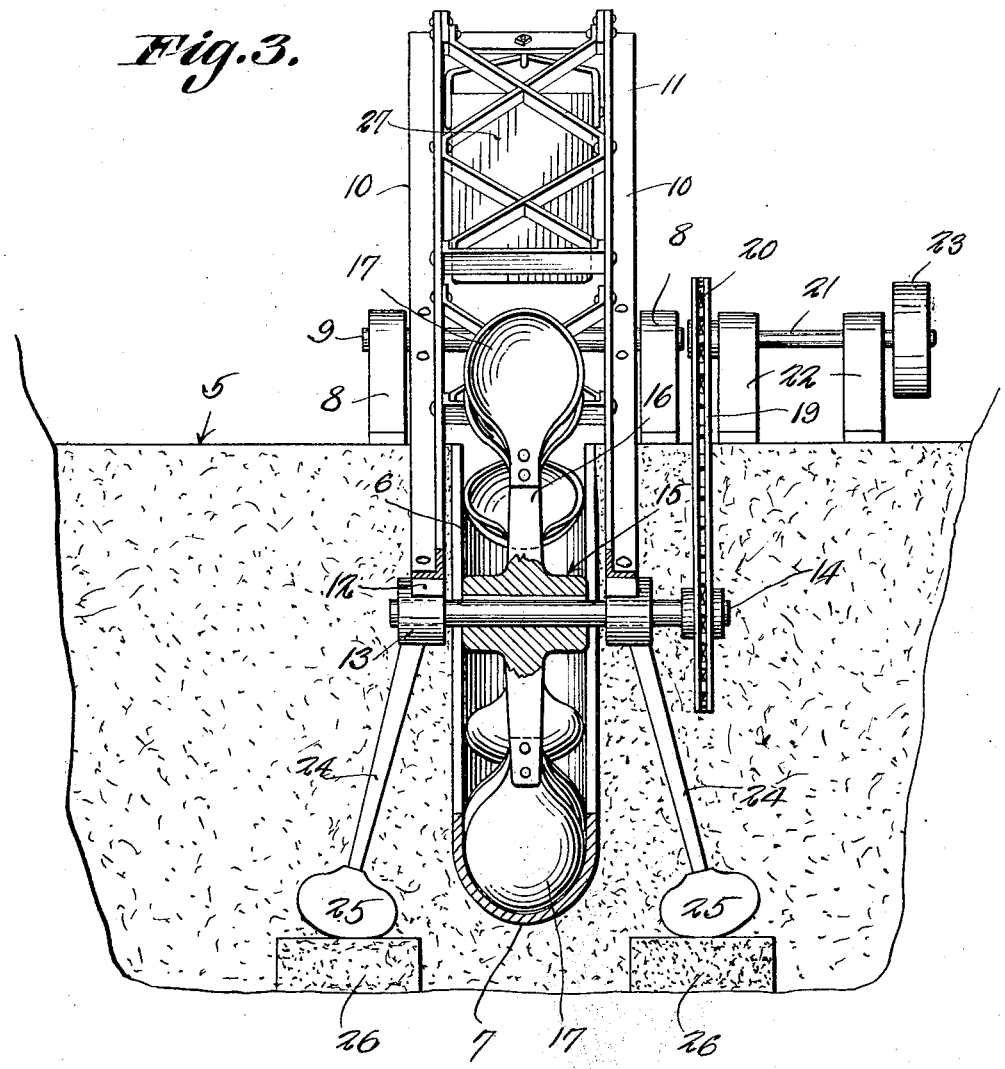

Patented Mar. 12, 1929.

1,704,691

UNITED STATES PATENT OFFICE.

ARTHUR CARPENTER, OF EATONTON, GEORGIA.

WATER WHEEL.

Application filed March 30, 1927. Serial No. 179,620.

This invention relates to a water wheel construction and aims to provide means whereby a water wheel will operate to generate power with the minimum amount of water.

An important object of the invention is to provide a water wheel constructed so that it will automatically rise with the rising of the water in the stream in which the wheel is positioned, thereby insuring against damage to the wheel during floods or high water.

A still further object of the invention is to provide a trough in which the blades of the wheel operate, the trough being of a width slightly greater than the width of the blades so that the entire force of the water passing through the trough will be directed to the blades.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is a front elevational view the trough and hub of the wheel being shown in section.

Figure 1:
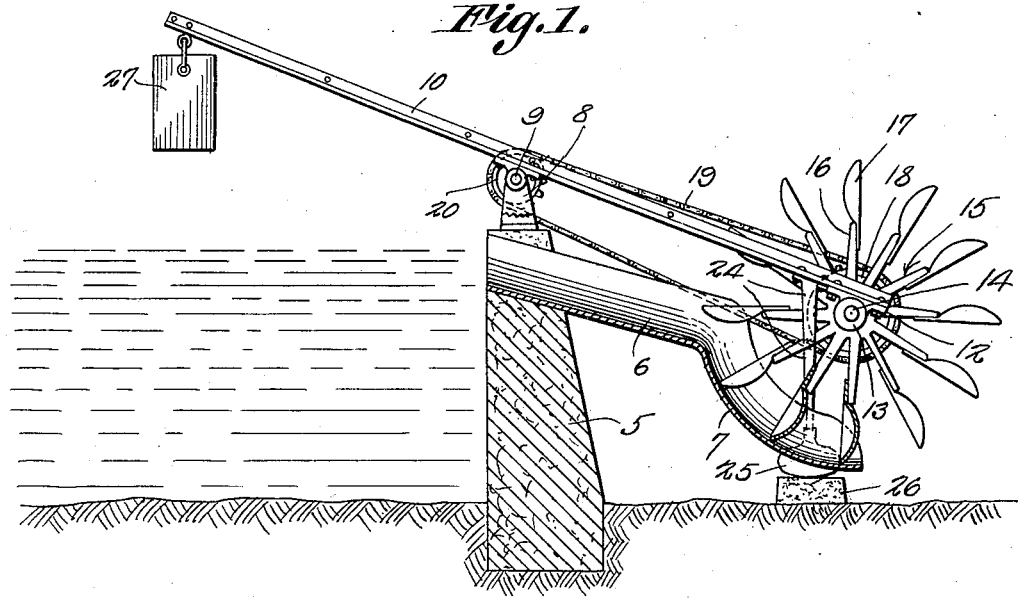
Figure 1 is a sectional view through a dam and trough illustrating a water wheel constructed in accordance with the invention as supported thereon.
Figure 2:
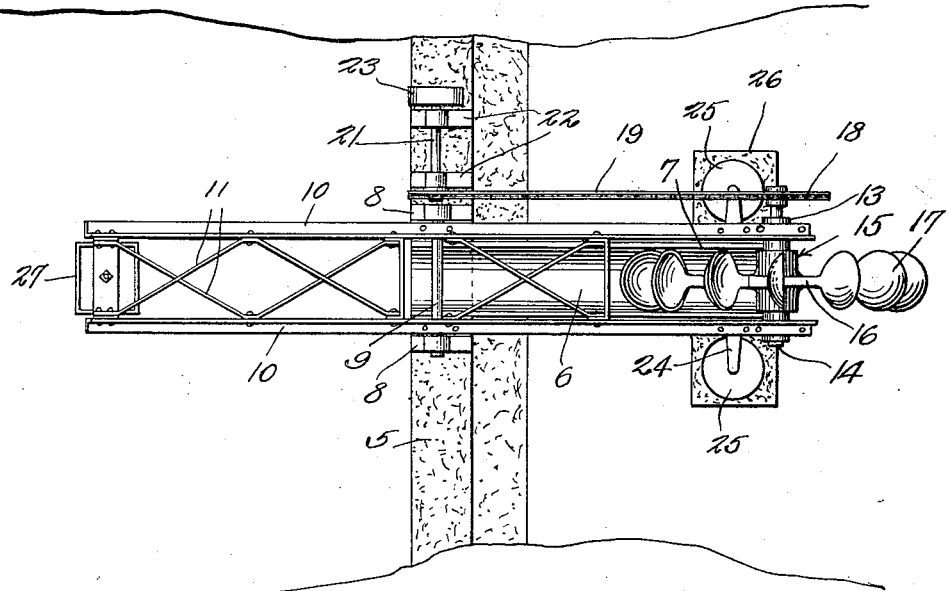
Figure 2 is a plan view thereof.

Referring to the drawings in detail, the reference character 5 designates a dam to which the trough 6 is secured, the trough being inclined as clearly shown by Figure 1 and provided with a lower curved spillway 7 in which the water spills, upon passing through the trough.

Positioned adjacent to the trough 6 and mounted on the upper surface of the dam 5 are bearings 8 in which the shaft 9 is positioned, the shaft 9 providing the support for the bars 10 which are constructed preferably of angle bar material and held in suitable spaced relation by means of the brace rods 11.

At the forward end of the bars 10 are depending brackets 12 in which the bearings 13 are supported, the bearings providing a support for the shaft 14 on which the wheel 15 is mounted.

The wheel 15 embodies a hub section, arms 16 radiating from the hub section, which arms 16 support the blades 17 which are substantially scoop-shaped and constructed to closely fit within the spillway 7 so that the water passing into the spillway will contact with the blades and the blades will receive the entire force of the water, to the end that the wheel will operate under the minimum amount of water-flow.

Mounted on one end of the shaft 14 is a sprocket 18 over which the chain 19 moves, the chain 19 also operating over the sprocket 20 carried at one end of the shaft 21 mounted in the bearings 22 that are also supported on the upper surface of the dam as clearly shown by the drawings.

On one end of the shaft 21 is a pulley 23 over which a suitable belt may operate to take off power from the pulley for any suitable purpose.

Secured to the forward end of the frame which includes the bars 10 are the arms 24 which carry floats 25 at their free ends, which floats normally rest on the supports 26, the floats being designed to float on the surface of the water in case of high water, to elevate the water wheel, thereby insuring against damage to the water wheel and at the same time insuring the operation of the water wheel under all water conditions.

A weight indicated at 27 is swung from one end of the frame or bars 10 to properly balance the water wheel, the weight 27 acting as a counter weight to insure the efficient operation of the device.

From the foregoing it will be obvious that due to this construction, regardless of the amount of water flowing into the trough, the water wheel will be maintained in its operative position at all times to insure against damage to the wheel during high water.

I claim:—

A water motor including a stationary transversely curved trough, a frame pivotally supported intermediate its ends, and disposed above the trough, said trough having a forward curved portion, a water wheel operating within the forward curved portion, said wheel being mounted at the outer end of the frame and including a hub and spokes radiating from the hub, scoop shaped blades supported by said spokes and closely fitting in the trough, arms extending downwardly from the outer end of the frame, floats on the lower ends of the arms to elevate the wheel from its position within the trough with the rise of the water at the forward end of the trough, and means for taking off power from the water wheel.

In testimony that I claim the foregoing as my own, I have hereto affixed my signature.

ARTHUR CARPENTER.